March 15, 1955 D. W. BOTSTIBER 2,704,156
SELF-CLOSING MAGNETIC DRAIN UNIT
Filed March 3, 1953 2 Sheets-Sheet 2
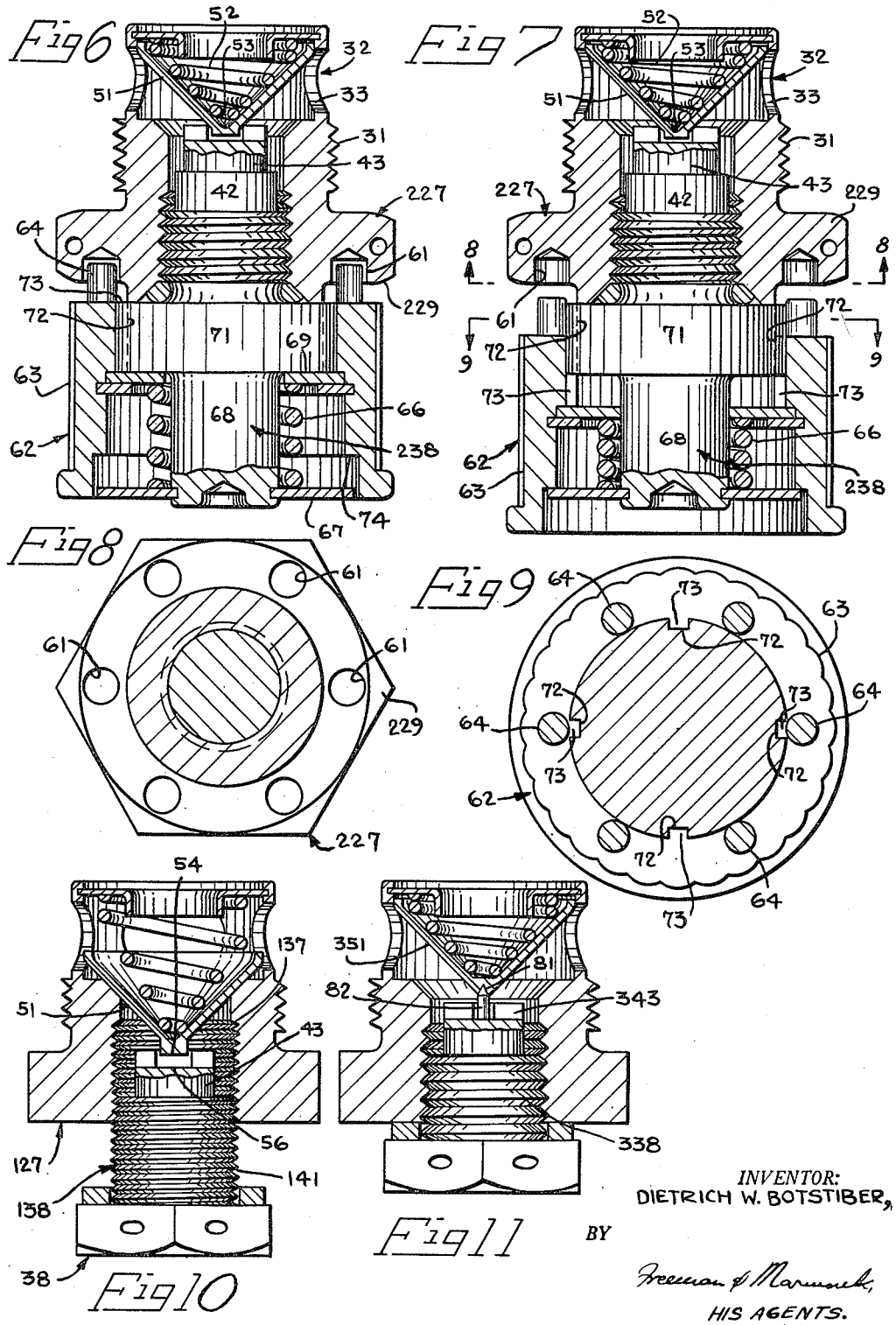
INVENTOR:
DIETRICH W. BOTSTIBER,
BY
Freeman & Marmorek,
HIS AGENTS.

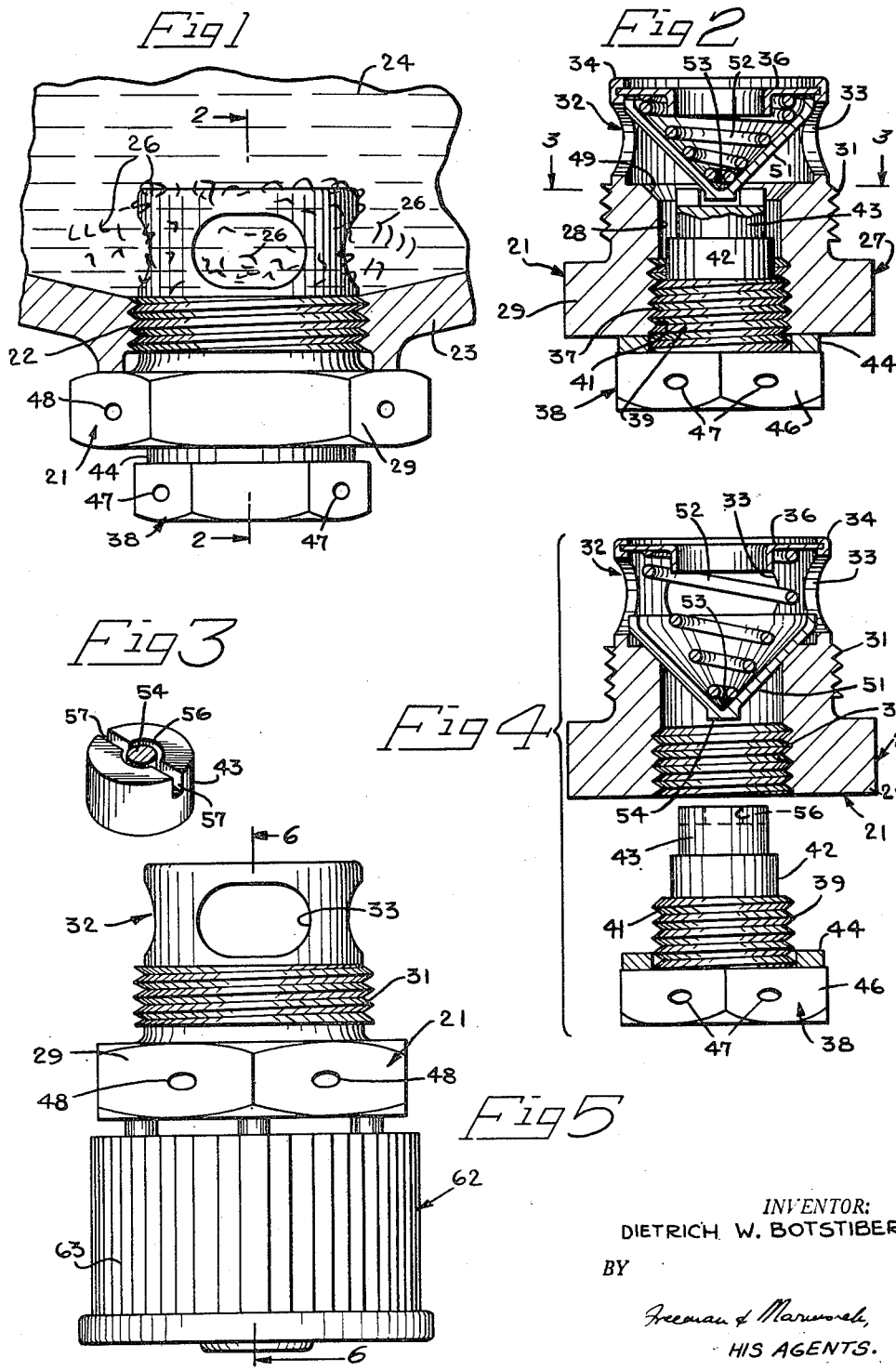

United States Patent Office 2,704,156
Patented Mar. 15, 1955

2,704,156

SELF-CLOSING MAGNETIC DRAIN UNIT

Dietrich W. Botstiber, Philadelphia, Pa.

Application March 3, 1953, Serial No. 340,007

4 Claims. (Cl. 210—1.5)

The invention relates to the draining of lubricating reservoirs and relates more particularly to a self-closing magnetic drain unit adapted to remove magnetizable particles from the lubricant.

Magnetic drain plugs are used in connection with oil sumps of combustion engines, gear cases and similar types of machinery for the purpose of removing particles of ferrous material which are carried in the lubrication oil. The removal of the magnetic plug and its inspection for presence of such particles or chips is a frequent inspection procedure. It has the disadvantage that the lubricant will drain out when the plug is removed, unless the drain hole is immediately closed after the plug is removed.

In the past, drain units were developed having a valve that closed when the magnetic insert was removed, in order to prevent the unwanted draining of lubricant. However, units of this type that have been developed heretofore, had the disadvantage of large dimensions making it difficult to apply these units to constructions where only a small space was available, for instance in connection with aircraft engine draining. The large dimensions of prior devices were caused by the necessary length of guiding surfaces between a stationary plug element and a movable valve element, which had to be made long enough to provide for linear guidance to obviate the effect of any sidewardly directed forces applying against the valve element.

It is among the objects of the instant invention to provide a magnetic drain unit that is self-closing and that, owing to its constructional features, is of extremely small dimension and usable even where only small space is available.

In accordance with the instant invention there are no guiding surfaces along which the valve may slide, and instead a guiding by centering is provided between the movable plug and the movable valve; furthermore, in accordance with one of the embodiments a conical spring is made use of that aids in guiding. By this arrangement, the axial dimension of the drain unit, the largeness of which has heretofore proved quite troublesome, can be reduced considerably without any disadvantage in the effectiveness of the drain unit, resulting in a unit that is usable almost anywhere, even where only very limited space is available or access is difficult.

The invention accordingly comprises the features of construction, combination of elements and arrangement of parts which will be exemplified in a construction hereinafter set forth and the scope of the application of which will be indicated in the claims.

The foregoing and other objects of the invention will be best understood from the following description of exemplifications thereof, reference being had to the accompanying drawings, wherein:

Fig. 1 is an elevational view, partly in section, showing a self-closing magnetic drain unit in accordance with an embodiment of the invention, in elevation depicted emplaced in a liquid-holding reservoir illustrated in fragmentary section;

Fig. 2 is an axial sectional view taken on line 2—2 of Fig. 1, showing the plug fully screwed in;

Fig. 3 is a perspective view, partly in section taken on line 3—3 of Fig. 2, showing a valve guide detail;

Fig. 4 is an extended sectional view of the embodiment shown in Fig. 2, but with the plug removed;

Fig. 5 is an elevational view of a modification;

Fig. 6 is an axial sectional view taken on line 6—6 of Fig. 5, wherein the knob is shown in locked position;

Fig. 7 is a sectional view similar to Fig. 6, but showing the knob in unlocked, retracted position;

Fig. 8 is a transverse sectional view taken on line 8—8 of Fig. 7;

Fig. 9 is a transverse sectional view taken on line 9—9 of Fig. 7;

Fig. 10 is an axial sectional view, similar to Fig. 2, but embodying a further modification and showing the plug only partially screwed-in; and Fig. 11 is an axial sectional view, similar to Fig. 2, but embodying a still further modification.

In carrying the invention into effect in the embodiments which have been selected for illustration in the accompanying drawings and for description in this specification, and referring now particularly to Figs. 1–4, there is provided a drain unit, generally indicated at 21, that is secured to the drain opening 22 of a reservoir or casing 23 that has on its interior a liquid such as a lubricant 24 in which there may be carried ferrous particles, such as steel chips 26.

As best shown in Fig. 2, the unit 21 comprises a closure member 27 that defines on its interior an elongated passage 28 axially of the member 27. A flange 29, for instance of hexagonal shape for wrench application, abuts against the underside of the casing 23 and means, such as a gasket (not shown), may be provided for tight sealing of the member 27 against the casing 23.

The member 27 carries an external thread 31 for screwing into the drain opening 22 and, above that thread 31, the member 27 is provided with an extension 32. The extension 32 has a series of radial openings 33 that intercommunicate interiorly with the passage 28. The extension 32 projects into the interior of the casing 23 and, as best shown in Fig. 1, is surrounded by lubricant that can, when the unit is in the position shown in Fig. 2, enter through the openings 33 towards the passage 28. The extension 32 is provided, beyond the openings 33, with an annular element 34 that holds a centrally flanged backing plate 36.

The passage 28 is provided on its interior with a thread 37 that extends from the outer end of the flange 29 for a portion of the length of the passage 28. A plug, generally indicated at 38, is removably disposed in the passage 28. The plug 38 has a body portion 39 that is provided with a thread 41, and that thread 41 engages the thread 37 of the passage 28. Adjacent the body 39, the plug 38 has a portion 42 of reduced diameter, and that portion 42 carries a head 43 which is disposed in the passage 28 and reaches to a point near the openings 33. The head 43 is thus, in the position of the drain unit shown in Fig. 2, exposed to the liquid 24 as well as to the chips 26 that may be swept by the liquid through the openings 33.

The closure member 27 is made of non-magnetic material, and likewise the plate 36 is non-magnetic; the plug 38 including the body 39 and portion 42 is preferably also non-magnetic. However, the head 43 is made of magnetic material, for instance of the type made of an alloy and available commercially under the trade names "Alnico," "Cunico" and so forth.

The magnetic head 43, therefore, will attract the chips 26 which, in turn, will adhere to the head 43. Consequently, when the plug 38 is unscrewed from its position in the passage 28 and removed off the member 27, the chips 26 that adhere to the head 43 will be removed off the passage 28 with the plug and can then be taken off the head 43.

A gasket 44 may be provided between the flange 29 of the member 27 and the end portion 46 of the plug 38. This end portion 46, as shown in Fig. 2, may be of hexagonal shape, and means such as wires or pins 47, may be provided to prevent accidental unscrewing of the plug 38 from its emplacement in the member 27. Similar wires or pins 48 may be provided for locking of the member 27. The pins 47 and 48 may be connected to the casing in any well-known conventional manner.

A tapered, annular valve seat 49 is formed in the passage 28 near the intersection thereof with the openings 33. A conical valve or closing member 51 is provided for the seat 49. The taper of the valve cone is the same as that of the seat 49, for cooperation between the valve and seat. The valve 51 is movable between a retracted position shown in Fig. 2 and a closure position shown in Fig. 4. A conical spring 52 abuts with its wide end against the outer portion of the plate 36, surrounding the flanged aperture thereof, and the spring 52 presses with its narrow end against the inner apex 53 of the valve 51.

The type conical spring 52 and particular application to the apex 53 provide a certain amount of centering and balanced guiding for the movement of the valve 51. However, separate means also are provided, between the plug 38 and the valve 51, for guiding the valve 51 during the movement thereof between the retracted and closure positions.

An embodiment of this means is shown in Figs. 2 and 3 and comprises a cylindrical extension 54 on the valve 51 concentric with the passage 28 and a corresponding cylindrical depression 56 on the head 43 also concentric with the passage 28. Two slots 57 intercommunicate with the depression 56 to permit cleaning of the depression 56.

The plug 38 is removably inserted in the passage 28. During insertion, the extension 54 of the valve 51 will be engaged by the depression 56. As the plug 38 is screwed in, the head 43, owing to the engagement between the extension 54 and the depression 56, will press the valve from the closure position (Fig. 4) to the retracted position (Fig. 2). During this tied movement, the depression 56 will guide the extension 54 and will thereby center and guide the valve 51 during the retraction push. Conversely, when the plug is removed, there will be a similar tied valve release movement until the valve 51 reaches the valve seat 49, and during this movement the valve 51 will again be centered and guided by the engagement of the extension 54 in the depression 56.

As best shown in Fig. 2, when the valve 51 is in the retracted position, its outer tapered surface will deflect the liquid and the chips suspended therein which enter through the openings 33, towards the magnetic head 43. On the other hand, as best shown in Fig. 4, when the valve 51 is in closure position, the liquid 24 may pass through the openings 33 but cannot enter into the lower or exit portion of the passage 28, and thus the valve 51 will effectively seal the drain when the plug 38 is removed.

The operation of the above-described embodiment is as follows.

In the normal relationship of parts, shown in Fig. 2, the plug 38 is in its inner position in which it presses the valve 51 into the retracted valve position. Liquid can enter through the openings 33 and is deflected by the shape of the external surface of the valve 51 towards the magnetic head 43. In this position, the extension 53 of the valve 51 is engaged in the depression 56 of the head 43, and the spring 52 urges the valve 51 to maintain this interengagement.

Magnetizable chips 26 that may be suspended in the lubricant 24 are swept by the lubricant towards the magnetic head 43 and will adhere thereto through magnetic action.

When it is desired to free the head 43 of chips 26, and this cleaning operation under actual working conditions will be done periodically, the plug 38 is unscrewed from the passage 28 and is completely removed therefrom for a subsequent cleaning of the head 43, for instance by brush or blasting application. During the removal movement, there will for a portion at least, be tied movement of the plug 38 and the valve 51, until the valve 51 reaches the seat 49. During this tied movement, the extension 54 and depression 56 will remain interengaged, thereby centering and guiding the valve concentrically to the seat 49. The valve will be pressed into, and be maintained in, this interengagement, and moved, by the action of the spring 52, and the conical shape of that spring 52 will aid in the centering of the valve 51. The plug 38 is so dimensioned that the valve 51 will reach the seat 49 preferably before or shortly after the thread 41 is disengaged from the thread 37, so that only a negligible amount of lubricant will be discharged during the removal of the plug 38.

After the plug has been cleaned, it is reinserted in the passage 28. Where the threads 37 and 41 are short, the plug 38 will first have to be pushed against the valve 51 and subsequently be screwed on. During the screwing in, the depression 56 will be engaged with the extension 54 and the push against the valve 51 be exerted against the action of the spring 52, until the valve 51 reaches the retracted position, while being centered and guided during the retraction movement by the interengagement of the extension 54 and the depression 56.

Instead of making the threads 37 and 41 short so that the plug 38 is threaded in and out by the application of only a few turns, it is possible to provide for threading in such a manner that the screwing-in of the plug is always started before the head engages the valve, and conversely that the valve always reaches the valve seat before the plug is removed entirely off its threading engagement in the passage. In order not to lengthen the size of the passage and of the plug, this may be accomplished, for instance, by providing fine threads for both.

An embodiment of this modified device is shown in Fig. 10, wherein the fine thread 141 of the plug 138 engages the fine thread 137 of the closure member 127. Interengagement between the extension 54 of the valve 51 and the depression 56 of the head 43 takes place only during a portion of the inward and outward threading movements of the plug 138. In other respects, the operation of the embodiment of Fig. 10 is similar to that of the device shown in Figs. 1–4.

As explained earlier herein, means may be provided to prevent accidental unscrewing of the plug from its emplacement in the passage of the closure member, and this means has been identified previously as wires or pins 47 (Fig. 2). However, particularly where only limited accessibility is had, for instance in aircraft engine installations, it may be desirable to provide for a quick release in connection with the locking of the plug. A mechanism for quickly releasably locking the plug is shown in Figs. 5–9.

As best shown in Fig. 6, there is provided a closure member, generally indicated at 227, in which there is disposed in threaded engagement a plug generally designated 238. In all other respects, save those described hereinbelow, the drain unit shown in Figs. 5–9 has parts similar to, and operates like, the device previously described in connection with the illustrations of Figs. 1–4, and all the parts that remain unaltered are designated by the same reference numerals, whereas the changed parts are referred to by numerals having an additional first digit.

The flange 229 has a plurality of recesses 61 that are formed in the outer face of the flange and which are spaced regularly from each other along the flange periphery. A hollow knob 62 is carried by the plug 238 and is provided with a knurled outer surface 63, and has a series of frontal fingers 64. The fingers 64 are spaced along the frontal periphery of the knob 62, and the series of fingers 64 matches that of the series of recesses 61, so that in locking position shown in Fig. 6 each finger 64 engages in a recess 61. A spring 66 is positioned operatively to urge the knob inwardly or forwardly relative to the closure member 227 to press the fingers 64 into engagement with the recesses 61, and this interengagement prevents the knob 62 from turning.

The spring 66 bears with its rear end against a plate 67 that is secured to a rear projection 68 which is formed on the plug 238, and the spring 66 presses with its front end onto a washer 69 that is removably secured on the interior of the knob 62.

A flange 71 is integrally formed on the plug 238 and is provided with a series of slots 72 that are parallel to the plug axis. The knob 62 has a series of fins 73, and each fin 73 is disposed slidably in a slot 72, and by this arrangement the knob 62 is slidable axially of the plug 238 while being tied for rotation with the plug 238. The sliding of the knob 62 is limited in both directions; the inward or forward sliding is limited by abutment between the washer 69 and the outer surface of the flange 71 of the plug 238, and in this inward position, as shown in Fig. 6, the fingers 64 protrude into the recesses 61 without, however, touching the bottoms thereof; the outward or rearward sliding of the knob 62, on the other hand, is limited by the abutment of a shoulder 74 that is formed interiorly on the knob 62 and the plate 67 that is secured on the plug 238, and in that outward position, as best shown in Fig. 7, the fingers 64 are clear of the recesses 61 so that the knob 62 together with the plug 238 can be turned relative to the closure member 227.

The spring 66 urges the knob into the inward position, and the knob can be pulled to slide to the outward position, by hand, against the power of the spring 66.

The operation of the modification shown in Figs. 5–9 is as follows.

To remove the plug 238, the operator will pull the knob 62 from the inward position (Fig. 6) to the outward position (Fig. 7), to remove the fingers 64 from engagement in the recesses 61. While still pulling the knob, the operator will turn the knob to unscrew thereby the plug 238. After a few turns, the plug 238 will have been unscrewed far enough so that cessation of the pulling action on the knob will no longer be able to bring the fingers 64 into the recesses 61. The unscrewing of the plug, which is done entirely by turning the knob 62, is continued until the plug 238 is removed off the member 227.

Conversely, in screwing-in the plug 238, the threading is again done entirely by turning of the knob 62. At first, the knob will be turned normally, but towards the end the operator will exert an outwardly directed pulling action on the knob in order to prevent interengagement of the fingers 64 with the recesses 61 during the turning. When the plug is threaded into its inner position (Fig. 6), the operator will juxtapose the fingers 64 opposite the recesses 61 and then will release the knob 62, which will thereupon be pressed inwardly by the action of the spring 66, so that each finger 64 will protrude into a recess 61; thus the knob 62 is locked against turning, and thereby the plug 238 is prevented from accidental unscrewing and removal.

A further modification is shown in Fig. 11, in which the elements of the centering and guiding means for the valve are reversed as compared to the embodiment shown in the previous views. The valve 351 has axially a conical recess 81, and the head 343 has axially formed a pin 82 that has a conical tip matching the taper of the conical recess 81. When the pin 82 engages the recess 81, during at least a portion of the axial movement of the plug 338, the valve 351 is centered and guided as it is moved between retracted and closure positions.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

Having thus described the invention, what I claim as new and desire to be secured by Letters Patent, is as follows:

1. In a magnetic drain unit, for use in connection with a lubricant casing, in combination, a nonmagnetic closure member including a hollow housing projecting into said casing and having a drain passage and defining a chamber adjacent said passage and communicating therewith, said chamber being closed opposite said passage and apertured for the entry into said chamber of lubricant at an angle to the axis of said drain passage, a valve seat formed in said passage, a valve movable in said chamber between a closure position in which it is disposed on said seat to seal said passage and clear the path of lubricant through said chamber and, respectively, an open position in which it is spaced from said valve seat and deflects towards said passage lubricant entering said chamber, a plug removably positioned in said passage for sealing of said passage when said valve is in said open position and having a magnetic head disposed adjacent said chamber when said plug is inserted in said passage exposing said head to the lubricant collecting in said chamber for attracting magnetizable particles suspended in said lubricant, means intermediate said head and said valve for guiding and centering said valve during movement between said positions, and resilient means operable for biasing said valve towards said closure position, said head being operable to push said valve into said open position during insertion of said plug into said passage.

2. In a magnetic drain unit, as claimed in claim 1, said valve having an inverted conical shape, said resilient means including a spring mounted on the interior of said cone and operable to press the apex of said cone towards abutment contact with the inner end of said plug.

3. In a magnetic drain unit, as claimed in claim 1, together with threading means between said plug and said casing for removably inserting said plug into said passage, and releasable means operable for locking said plug in said passage following insertion of said plug.

4. In a magnetic drain unit, as claimed in claim 3, said locking means comprising a knob slidable axially of said plug, means intermediate said knob and said plug actuable for interengaging the same in all positions for rotation in either direction, means intermediate said plug and said member operable for interlocking the same when said knob is slid forwardly on said plug when the latter is near said inner position, and resilient means between said plug and said knob and operable to urge said knob forwardly, whereby said knob and plug will be locked against rotation in said inner plug position as said knob engages said member, and will be released for rotation when said knob is retracted against the power of said resilient means.

References Cited in the file of this patent

UNITED STATES PATENTS

| | | |
|---|---|---|
| 1,365,644 | Applin | Jan. 18, 1921 |
| 1,507,098 | Walker | Sept. 2, 1924 |
| 1,720,380 | Schulze | July 9, 1929 |
| 1,806,001 | Simms et al. | May 19, 1931 |
| 2,358,612 | Acker | Sept. 19, 1944 |